Sept. 7, 1965             H. L. SNITZ             3,204,608
ANIMAL TRAINING FOOD DISPENSER
Filed May 4, 1964
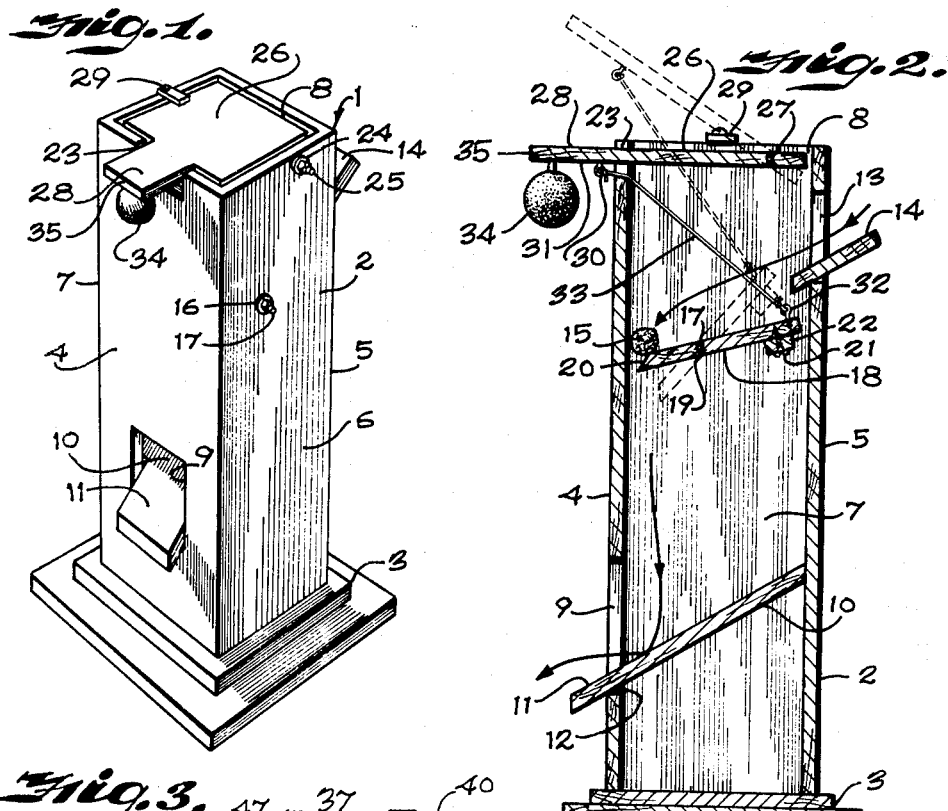
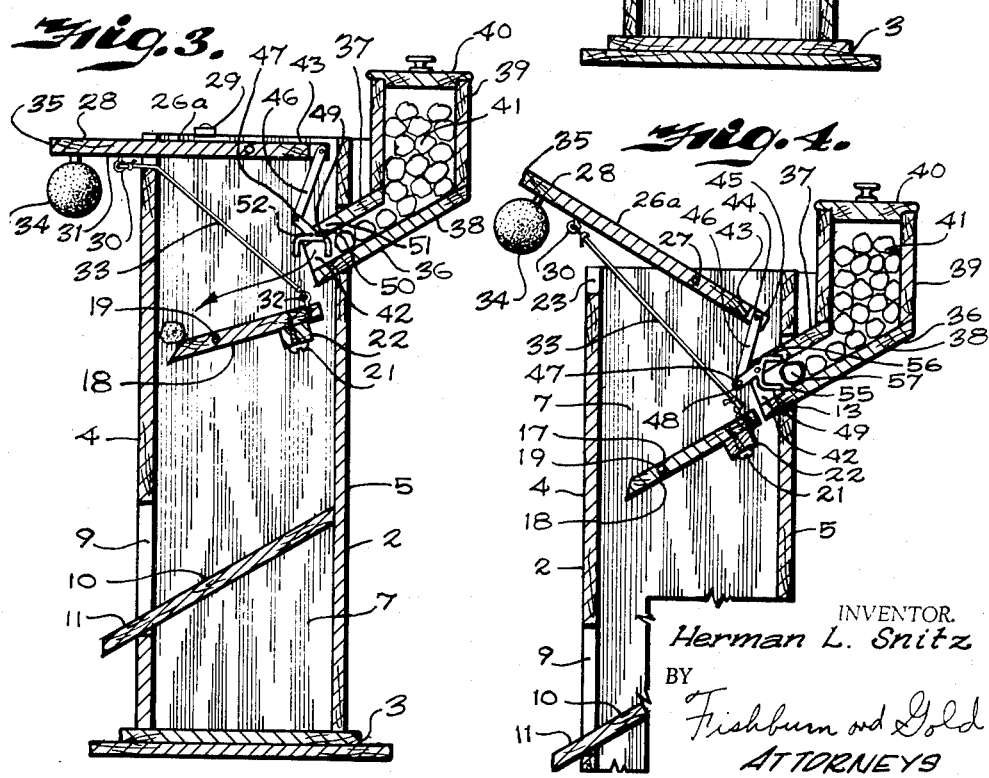
INVENTOR.
Herman L. Snitz
BY
Fishburn and Gold
ATTORNEYS United States Patent Office 3,204,608
Patented Sept. 7, 1965

3,204,608
ANIMAL TRAINING FOOD DISPENSER
Herman L. Snitz, 7225 Outlook, Overland Park, Kans.
Filed May 4, 1964, Ser. No. 364,452
12 Claims. (Cl. 119—54)

This invention relates to a food particle dispenser for animals and the like and is also utilized for training of animals.

The device may be utilized for feeding of animals by depositing a particle of such food one at a time in a container portion of the device and providing a pivoted mechanism whereby the animal upon movement of the pivoted mechanism will despense the food particle from the device to a position where it may be consumed as a reward for a correct manipulation of the pivoted mechanism.

In another form of the invention a supply of food in particle form is contained in a hopper mounted on the device and pivoted mechanism is utilized whereby one particle is dispensed at a time by operation of the pivoted mechanism by the animal. In its latter form the device is a self-feeding mechanism providing the animal is trained to operate it.

The principal object of the invention therefore is to provide a device of this character whereby a particle of food may be placed by hand in the upper portion of the column of the device and providing a pivoted platform for retaining the particle of food thereon until the pivoting mechanism moves the platform to a releasing position whereby the food particle may drop to an inclined surface and be dispensed through an opening in the front wall of the column to the animal.

Other objects of the invention are to provide a device having a base and an upstanding hollow column provided with an inclined wall near the lower portion of the column having a tongue extending through an opening in the wall thereof; to provide a pivoted food retaining and releasing platform within the column spaced above the inclined wall; to provide the column with an open top and having a pivoted cover member provided with a tongue extending outwardly from one side of the column; to provide connecting means with the tongue and with the rear portion of the food retaining platform; to provide the column opposite the opening in the lower side thereof with an opening near the top thereof above the pivoted platform with an inclined wall in the latter opening whereby a particle of food may be dropped on the inclined wall and move by gravity to the pivoted platform; and to provide the tongue on the cover member with a device attractive to the animal whereby the moving or pushing on this device by the animal will raise the pivoted lid thereby causing the pivoted food retaining platform to release the food particle thereon whereby it will drop to the lower inclined wall and will be dispensed to the animal.

Still further objects of this invention are to provide a chute in the opening in the upper wall of the column, the chute being inclined outwardly and upwardly and terminating in a hopper or chamber for retaining a plurality of food particles; to provide the rear portion of the cover member with link mechanism connected to a pivoted U-shaped dispensing member whereby upon raising of the pivoted cover member by the animal, the U-shaped member will engage a particle of food and the release of the cover by the animal will cause the cover member to resume its normally closed position thereby moving the particle of food to the inclined pivoted wall member so, upon the next repetitious operation of the pivoted cover, the food particle will fall to the floor of the inclined wall and finally through the opening in the lower wall of the column to be consumed by the animal.

Other objects and advantages of this invention will become apparent from the following description taken in connection with the accompanying drawings wherein are set forth by way of illustration and example certain embodiments of this invention.

FIG. 1 is a perspective view of my device particularly illustrating the forward side thereof.

FIG. 2. is a vertical cross sectional view through the device showing the pivoting action in broken lines.

FIG. 3 is a vertical cross sectional view through a modified form of the device, particularly illustrating the hopper or food chamber for housing a plurality of particles of food, the device being shown in the position for the animal to operate the cover member to dispense the particles of food therefrom.

FIG. 4 is a vertical cross sectional view of the device shown in FIG. 3 with the cover member shown in raised position and the dispensing member ready to receive a particle of food from the chamber.

Referring more in detail to the drawings.

1 designates a food dispensing device for animals, embodying the features of my invention comprising a vertical hollow column or housing 2 supported on a base 3 having a front wall 4, a back wall 5 and sides 6 and 7. The column 2 has an open top 8 and the front wall 4 is provided with an opening 9 spaced upwardly from the base 3 but below the center of the column. An inclined partition or wall 10 is mounted in the column and has a tongue portion 11 extending through the opening 9 and resting upon the lower edge as indicated at 12 (FIG. 2). The back 5 of the column is provided near its upper end with an opening 13 in which is mounted an inclined member 14 upon which particles of food 15 may be placed by hand as will later be described.

The side walls 6 and 7 are provided with aligned openings 16, spaced from the open top of the column for receiving a rod or shaft 17 upon which is pivotally mounted a platform 18, the platform being of substantially the same width of the hollow column and having an opening 19 therethrough for receiving the pin 17. The forward end of the pivoted platform is beveled as indicated at 20 and the pivot point is nearer the beveled end than the rear end. Mounted on the underneath side of the pivoted platform by a screw of the like 21 is a weight 22 for holding the platform in its normal position which is slightly inclined as illustrated in FIG. 2.

The front wall 4 of the column is provided in its upper edge with a notch or cut out portion 23 and provided near the top of the column and through the sides 6 and 7 thereof and spaced from the rear wall 5 are aligned openings 24 for receiving a pin 25. A cover 26 is provided for the open top and has an opening 27 transversely therethrough for receiving the pin 25 and pivotally mounting the cover in the open top. The cover is provided with a tongue 28 which normally engages in the notch 23 in the front wall of the column. A keeper 29 is provided for holding the cover in locked position when desired. An eye screw 30 is secured to the underneath side 31 of the tongue 28 and an eye screw 32 is secured to the upper side of the rear end of the pivoted platform 18. A rod or flexible link 33 has its respective ends attached to the eye screws 31 and 32. A ball 34 or other animal attraction device is secured to the underneath side of the tongue 28 near its outer end 35.

When it is desired to feed the animal, the particle of food 15 is dropped on the inclined wall 14 where it moves through the opening 13 through the rear wall 5 of the column and falls on the pivoted platform 18 rolling to the forward end thereof against the inside of the front wall 4 as illustrated in FIG. 2. In order to dispense the particle of food from the column the cover 26 must be pivoted upwardly from the tongue end so as to move the pivoted platform 18 as shown in dotted lines in FIG. 2 so that the particle of food will drop to the inclined platform 10 and move through the opening 9 in the front wall 4 as illustrated by the arrows in FIG. 2.

In order for the animal to dispense the particle of food from the device it will have to be trained to operate the pivoted cover. This is done by training the animal to use its head or nose to push against the ball member 34 on the underneath side of the tongue of the cover and thus raise it upwardly as shown in dotted lines in FIG. 2. This form of the invention may be used as a training device for the animal and it will have to be trained to move the cover upwardly to dispense the food from the column. The usual methods of training of animals is utilized for this purpose.

FIGS. 3 and 4 show a modified form of the invention but as the column inclined partition and pivoted platform are of identical form to the device shown in FIG. 1 the same numerals have been applied thereto. The cover member in the form shown in FIGS. 3 and 4 is designated by the reference numeral 26a as it differs from the cover member 26 in an additional connection as later described. The modified structure will now be described.

In the opening 13 near the top of the back wall of the column an inclined chute 36 is provided consisting of an upper plate 37 and lower plate 38 secured to the outer ends of which is a vertically extending chamber or hopper 39 having an open top provided with a removable cover 40 for housing a supply of food particles as indicated at 41. The plates 37 and 38 of the chute member 36 provide a passageway 42 of a size to freely pass the food particles therethrough.

The rear end 43 of the cover 26a is provided with a notch 44 in which is pivotally mounted by a pin 45 one end of a link 46 having its other end pivotally connected by pin 47 to an arm 48 of a U-shaped member 49, the arm 48 extending slightly at an angle from the bar portion 50 of the U-shaped member. The upper plate member 37 of the chute is provided with a notch 51 in which is pivotally mounted by a pin 52, the arm 48 of the U-shaped member so that when the cover 26 is in normal position as shown in FIG. 3 the U-shaped member is in vertical position. When in this position one of the particles 41 has been dispensed from the container or housing 39 and is held at the inclined or beveled point of the pivoted platform 18.

Upon movement of the cover 26a upwardly in the same manner as described in relation to movement of the cover member 26 in the structure shown in FIGS. 1 and 2, the particle of food 41 on the end of the pivoted platform 18 is released to fall on the inclined platform 10 and move through the opening 9 to the animal.

When the forward end of the cover 26a moves upwardly the rear end will move downwardly causing the link 44 to move the other end of the arm 49 downwardly causing the U-shaped portion to assume a horizontal position as shown in FIG. 4, whereby the arms 55 and 56 of the U-shaped member will receive a particle of food as indicated at 57 (FIG. 4) and move it onto the pivoted platform 18 ready to be dispensed by the animal upon the releasing of the cover 26a. It will be seen that the particle of food will be released as soon as the U-shaped member assumes a vertical position so that the particle will drop off of the end of the inclined chute 36 also as illustrated in FIG. 3.

With this form of the invention an amount of food particles will be placed in the container 39 as is desired for the dog or other animals to be fed at one time or one day's feeding.

It will be obvious from the foregoing that I have provided an improved food dispensing device for animals whereby an animal may be trained to dispense the food particles therefrom one at a time and also whereby a supply of food may be contained in the device.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A device for training and feeding an animal to dispense food in particle form from a vertically extending hollow column having a base, a front, rear and side walls and an open top comprising:

(a) an inclined partition in said column spaced from said base, said front of the column having an opening therein and said partition having a tongue extending through said opening, (b) a platform in said column spaced above said partition, (c) means mounting said platform for pivotal movement in said column, said column having an opening in one wall thereof above said platform through which a particle of food is dropped to be retained on said platform, (d) a cover having a tongue portion, (e) means pivotally mounting said cover in said open top, said upper edge of the front of the column having a notch therein and said tongue extending outwardly therethrough, (f) means connected to one end of the platform and to the tongue on said cover, whereby an animal contacting the underneath side of said tongue on the cover will pivot the cover and thereby pivot said platform to drop the food particle onto said partition so that it will pass through the opening in the front wall of the column.

2. The apparatus of claim 1 including a weight on said platform for holding the same normally inclined position.

3. A device for training and feeding an animal to dispense food in particle form from a vertically extending hollow column having a base, a front, rear and side walls and an open top comprising:

(a) an inclined partition in said column spaced from said base, said front of the column having an opening therein and said partition having a tongue extending through said opening, (b) a platform in said column spaced above said partition, (c) means mounting said platform for pivotal movement in said column, said column having an opening in one wall thereof above said platform through which a particle of food is dropped to be retained on said platform, (d) a cover having a tongue portion, (e) means pivotally mounting said cover in said open top, said upper edge of the front of the column having a notch therein and said tongue extending outwardly therethrough, (f) means connected to one end of the platform and to the tongue on said cover, (g) attraction means on the underneath side of said tongue on the cover, whereby an animal contacting said attraction means will raise the cover and thereby pivot said platform to drop the food particle onto said partition so that it will pass through the opening in the front wall of the column.

4. The apparatus of claim 3 including a weight on said platform for holding the same normally in inclined position.

5. A device for training and feeding an animal to dispense food in particle form from a vertically extending hollow column having a base, a front, rear and side walls and an open top comprising:

(a) an inclined partition in said column spaced from said base, said front of the column having an opening therein and said partition having a tongue extending through said opening, (b) a platform in said column spaced above said partition, (c) means mounting said platform for pivotal movement in said column, said column having an opening in one wall thereof above said platform through which a particle of food is dropped to be retained on said platform, (d) a cover having a tongue portion, (e) means pivotally mounting said cover in said open top, said upper edge of the front of the column having a notch therein and said tongue extending outwardly therethrough, (f) link means connected to one end of the platform and to the underneath side of said tongue on said cover, (g) attraction means on the underneath side of said tongue on the cover, whereby an animal contacting said attraction means will raise the cover and thereby pivot said platform to drop the food particle onto said partition so that it will pass through the opening in the front wall of the column.

6. A device for training and feeding an animal to dispense food in particle form from a vertically extending hollow column having a base, a front, rear and side walls and an open top comprising:

(a) a partition in said column spaced from said base and inclined toward the front wall, said front wall of the column having an opening therein and said partition having a tongue extending through said opening, (b) an inclined platform in said column spaced above said partition, (c) means mounting said platform for pivotal movement in said column, said column having an opening in one wall thereof above said platform through which a particle of food is dropped to be retained on said platform, (d) a cover having a tongue portion, (e) means pivotally mounting said cover in said open top, said upper edge of the front of the column having a notch therein and said tongue extending outwardly therethrough, (f) link means connected to one end of the platform and to the tongue on said cover, whereby an animal contacting said attraction means will raise the cover and thereby pivot said platform to drop the food particle onto said partition so that it will pass through the opening in the front wall of the column.

7. The apparatus of claim 6 including an inclined wall in said opening in the back wall of said column upon which said particles of food are placed to move through said opening onto said platform.

8. An animal feeder comprising:

(a) a vertical hollow column having a base, front, back and side walls and an open top, said front wall having an opening spaced from said base and the top edge of the front having a notch therein, said back wall having an opening spaced from the open top, (b) an inclined partition in said column having a tongue portion extending through the opening in said front, (c) a pivoted platform in said column spaced below said opening in said back wall, (d) a cover pivotally mounted in said open top, said cover having a tongue portion engaging in said notch in the front wall, the underneath side of the tongue portion of said cover being adapted to be engaged by the animal to pivot said cover, (e) mean connected to one end of said platform and to said tongue on said cover, to pivot said platform upon pivoting said cover, (f) a container for food in particle form, said container having a chute extending into the opening in the back wall of said column and said chute being of a size to dispense one particle of food at a time onto said platform, (g) and means carried by the read end of said cover for engaging a particle of food in said chute when said cover is pivoted and deposit same on said platform when the cover is closed and whereby said particle will drop on said partition when the cover is pivoted and passed through the opening in the front wall of the column.

9. The apparatus of claim 8 including an attraction means for the animal carried by the underneath side of the tongue of the cover.

10. An animal feeder comprising:

(a) a vertical hollow column having a base, front, back and said walls and an open top, said front wall having an opening spaced from said base and the top edge of the front having a notch therein, said back wall having an opening spaced from the open top, (b) an inclined partition in said column having a tongue portion extending through the opening in said front, (c) a pivoted platform in said column spaced below said opening in said back wall, said platform having means for normally holding the same in inclined position, (d) a cover pivotally mounted in said open top, said cover having a tongue portion engaging in said notch in front wall, (e) means connected to one end of said platform and to said tongue on said cover, (f) a container for food in particle form, said container having a chute extending into the opening in the back wall of said column, and said chute being of a size to dispense one particle of food at a time, onto said platform, (g) an attraction means on the underneath side of the tongue portion of said cover adapted to be engaged by the animal to pivot said cover, (h) and means carried by the rear end of said cover for engaging a particle of food in said chute when said cover is pivoted and deposit same on said platform when the cover is closed and whereby said particle will drop on said partition when the cover is pivoted and pass through the opening in the front wall of the column.

11. The aparatus of claim 10 wherein the means connecting the cover and platform is a rod.

12. The apparatus of claim 10 wherein the last named means (h) consists of a U-shaped member having an arm pivotally attached to said chute and a link having one end pivotally connected to the rear end of the cover and its other end to said arm and whereby the arms of said U-shaped member pivot in said chute to receive a particle of food and move it into said platform upon pivoting said cover.

References Cited by the Examiner

UNITED STATES PATENTS 2,791,201   5/57   Jacob _____ 119—55

SAMUEL KOREN, *Primary Examiner.*